Oct. 30, 1951 K. L. NICODEMUS 2,573,352
COMBINED FISH AND BAIT BUCKET
Filed Jan. 26, 1950

Kenneth L. Nicodemus
INVENTOR.

Patented Oct. 30, 1951

2,573,352

UNITED STATES PATENT OFFICE 2,573,352

COMBINED FISH AND BAIT BUCKET

Kenneth L. Nicodemus, Dallas, Tex.

Application January 26, 1950, Serial No. 140,676

2 Claims. (Cl. 43—55)

This invention relates to new and useful improvements and structural refinements in fishing buckets, and the principal object of the invention is to provide a device of the character herein described, such as may be conveniently and effectively employed for preserving fish as well as bait in easily accessible but escape-proof manner.

This object is achieved by combining in a bucket a fish receptacle and a bait-receiving tray, an important feature of the invention residing in the provision of a common cover or lid for the receptacle and the tray, so that by simply opening the cover, access may be had to the fish as well as to the bait.

Some of the advantages of the invention reside in its simplicity of construction, in its convenient and expeditious operation, and in its adaptability to economical manufacture.

With the above more important objects and features in view and such other objects and features as may become apparent as this specification proceeds, the invention consists essentially in the arrangement and construction of parts as illustrated in the accompanying drawings, in which.

Like characters of reference are employed to designate like parts in the specification and throughout the several views.

Figure 1:
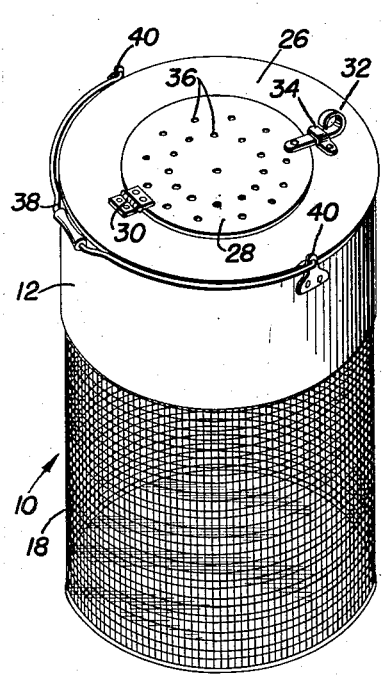
Figure 1 is a perspective view of the invention.
Figure 2:
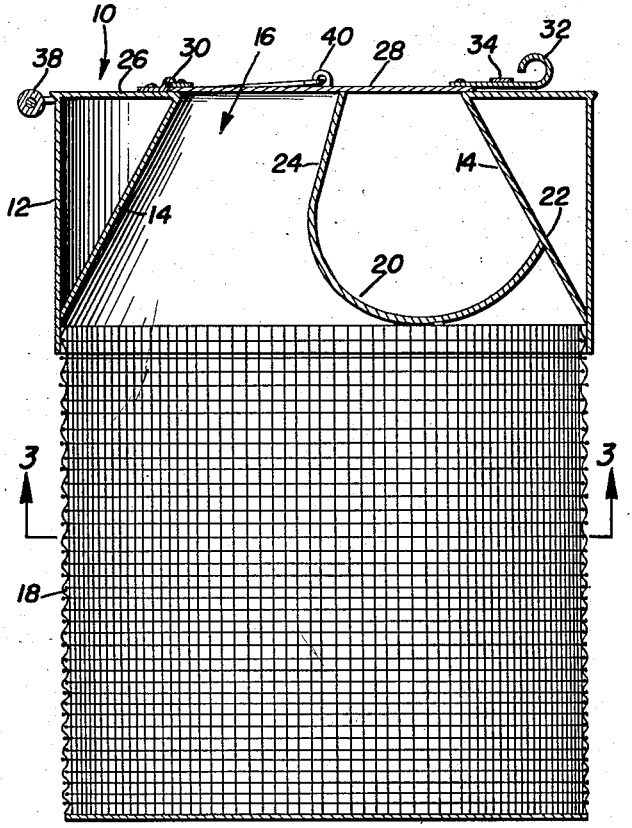
Figure 2 is a central vertical sectional view thereof.
Figure 3:
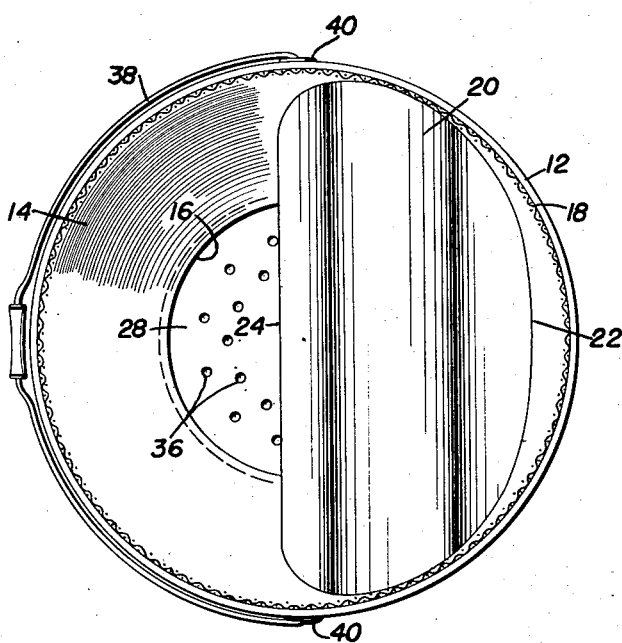
Figure 3 is a transverse sectional view, taken substantially in the plane of the line 3—3 in Figure 2.

Referring now to the accompanying drawings in detail, the invention consists of a combined fish and bait bucket which is designated generally by the reference character 10 and consists of an annular, hollow float 12 which has a downwardly and outwardly extending inner wall 14 defining a frusto-conical opening 16 at the center of the float, substantially as shown in Figure 2.

A foraminous fish receptacle 18 is secured at its upper edge to and depends from the float 12, it being understood that the float lends sufficient buoyancy to the entire bucket so as to enable the same to be sustained by flotation and prevent its possible loss by sinking.

The essence of novelty in the invention resides in the provision of a bait receiving tray 20 in the opening 16 of the float 12, this tray having a continuous, arcuate edge 22 secured to the inner wall 14 of the float, while a side wall 24 of the tray extends diametrically of the opening 16 so that the tray occupies substantially a half of the space in the opening and the remaining half of the opening affords a passage to the fish receptacle 18.

As is clearly shown in Figure 2, the side wall 24 of the tray 20 is flush with the upper surface 26 of the float 12, and a circular cover or lid 28 is hinged, as at 30, to the upper surface of the float so as to extend over the tray 20 as well as over the passage communicating with the fish receptacle 18. Needless to say, when the cover 28 is opened, access may be had to the fish in the receptacle as well as to the bait in the tray, and it is to be noted that a pivoted catch 32 is provided on the cover for engagement with a keeper 34 on the float 12, whereby the cover may be locked in a closed position.

Moreover, the cover 28 may be formed with a plurality of perforations 36 to facilitate breathing of the bait in the tray 20, while a swingable bail 38 may be connected to the float by upstanding brackets 40, so as to enable the entire bucket to be conveniently carried.

It is believed that the advantages and use of the invention will be clearly understood from the foregoing disclosure, and accordingly, further description thereof at this point is deemed unnecessary.

Having described the invention, what is claimed as new is:

1. In a combined fish and bait bucket, an annular float affording a substantially circular opening, a foraminous fish receptacle depending from said float, a bait receiving tray mounted in said opening and occupying substantially a half of the space therein whereby the remaining portion of the opening affords a passage to said receptacle, and a common cover provided on said float for said passage and said tray.

2. In a combined fish and bait bucket, an annular float having a downwardly and outwardly extending inner wall defining a frusto-conical opening, a foraminous fish receptacle depending from said float, a bait receiving tray secured to said inner wall and having a side wall extending diametrically of said opening whereby said tray occupies substantially a half of the space in the opening and whereby the remaining half of the opening affords a passage to said receptacle, said side wall being flush with the upper surface of said float, and a common cover on said float for said passage and said tray.

KENNETH L. NICODEMUS.

REFERENCES CITED

The following references are of record in the file of this patent:

UNITED STATES PATENTS

| Number | Name | Date |
|---|---|---|
| 454,241 | White | June 16, 1891 |
| 523,470 | Hemp | July 24, 1894 |
| 1,994,525 | Madda | Mar. 19, 1935 |

FOREIGN PATENTS

| Number | Country | Date |
|---|---|---|
| 383,166 | Germany | Feb. 18, 1922 |